Patented Apr. 7, 1942

2,278,783

UNITED STATES PATENT OFFICE 2,278,783

PROCESS FOR THE PREPARATION OF POLYVINYL FORMATE

Willy O. Herrmann, Deisenhofen, and Wolfram Haehnel, Munich, Germany, assignors to Dr. Alexander Wacker Gesellschaft für Elektrochemische Industrie, G. m. b. H., Munich, Germany, a corporation of Germany No Drawing. Application January 17, 1940, Serial No. 314,353. In Germany February 2, 1939

1 Claim. (Cl. 260—87)

This invention relates to the preparation of organic compounds and more particularly to the preparation of polymeric vinyl esters.

It has been known that polyvinyl esters can be prepared from polyvinyl alcohol (Ber. 60 1661 (1927)). The use of acid anhydrides and of special reaction conditions have been necessary.

This invention has as an object the provision of a simple process for the manufacture of polyvinyl formates. Other objects will appear hereinafter.

These objects are accomplished by the following invention wherein polyvinyl alcohol is esterified by dissolving it in formic acid.

In view of the prior art, it is surprising that polyvinyl formates can be obtained directly from polyvinyl alcohol and formic acid and, indeed, without the use of catalysts and without necessarily using high temperatures. In a solution of polyvinyl alcohol in formic acid produced without heating, the polyvinyl alcohol on standing even at room temperature is converted to a polyvinyl formate, which contains no free hydroxyl groups or only a few free hydroxyl groups. The reaction, which requires several hours at room temperature, can be shortened to a few minutes if it is carried out at higher temperatures, e. g., at 100° C.

The more detailed practice of the invention is illustrated by the following examples, wherein parts given are by weight. There are of course many forms of the invention other than these specific embodiments.

Example

One hundred grams of a neutral polyvinyl alcohol were dissolved in 900 cc. pure formic acid at 20° C. After the solution had stood for several days at room temperature, methanol was added until no further precipitation occurred. The precipitate was washed with methanol until acid-free; then washed with ether. The product obtained was dried at 20° C. and 11 mm. pressure. One hundred fifty-six grams of a polyvinyl formate were obtained, in which 85% of the original hydroxyl groups had been replaced by the formic acid radical.

By varying the concentration of the formic acid the number of formic acid radicals reacting with the polyvinyl alcohol can be controlled.

The polyvinyl formates, in which the originally present hydroxyl groups have been substituted by formic acid radicals up to 80–100%, give clear solutions in acetone, formic acid, dioxan and pyridine. They dissolve in concentrated hydrochloric acid.

The products obtained by the present process differ from polyvinyl formates produced by other methods, e. g., by the polymerization of monomeric vinyl formate, in that they can be saponified by aqueous alkalies.

The polyvinyl formates of the present process can, in general, be used for the same varied purposes as other polyvinyl esters and similar synthetic materials, e. g., in the lacquer, adhesive, insulating material, plastic, molded article, safety glass, etc., industries. The possibility afforded by this process for varying the ratio of the formic acid radicals to the hydroxyl groups in the polyvinyl formate products makes it possible to vary the properties of the product to correspond with the requirements of the special application with respect to solubility, thermo-plasticity, reactivity, etc.

The formates obtained are either very soluble or only slightly soluble in acetone depending upon the method of their preparation and therefore they can easily be worked up; on the other hand they are resistant to the usual motor fuels such as alcohol, benzene and benzine.

The above description and examples are intended to be illustrative only. Any modification of or variation therefrom which conforms to the spirit of the invention is intended to be included within the scope of the claim.

What is claimed is:

Process which comprises maintaining a reaction mixture consisting of 100 parts by weight of polyvinyl alcohol and 1100 parts by weight of formic acid at 20° C. for several days and isolating a polyvinyl formate having 15% free hydroxyl groups by precipitation with methanol.

WILLY O. HERRMANN.
WOLFRAM HAEHNEL.